R. C. COLWELL.
CAMERA.
APPLICATION FILED DEC. 12, 1917.
1,298,296.
Patented Mar. 25, 1919.
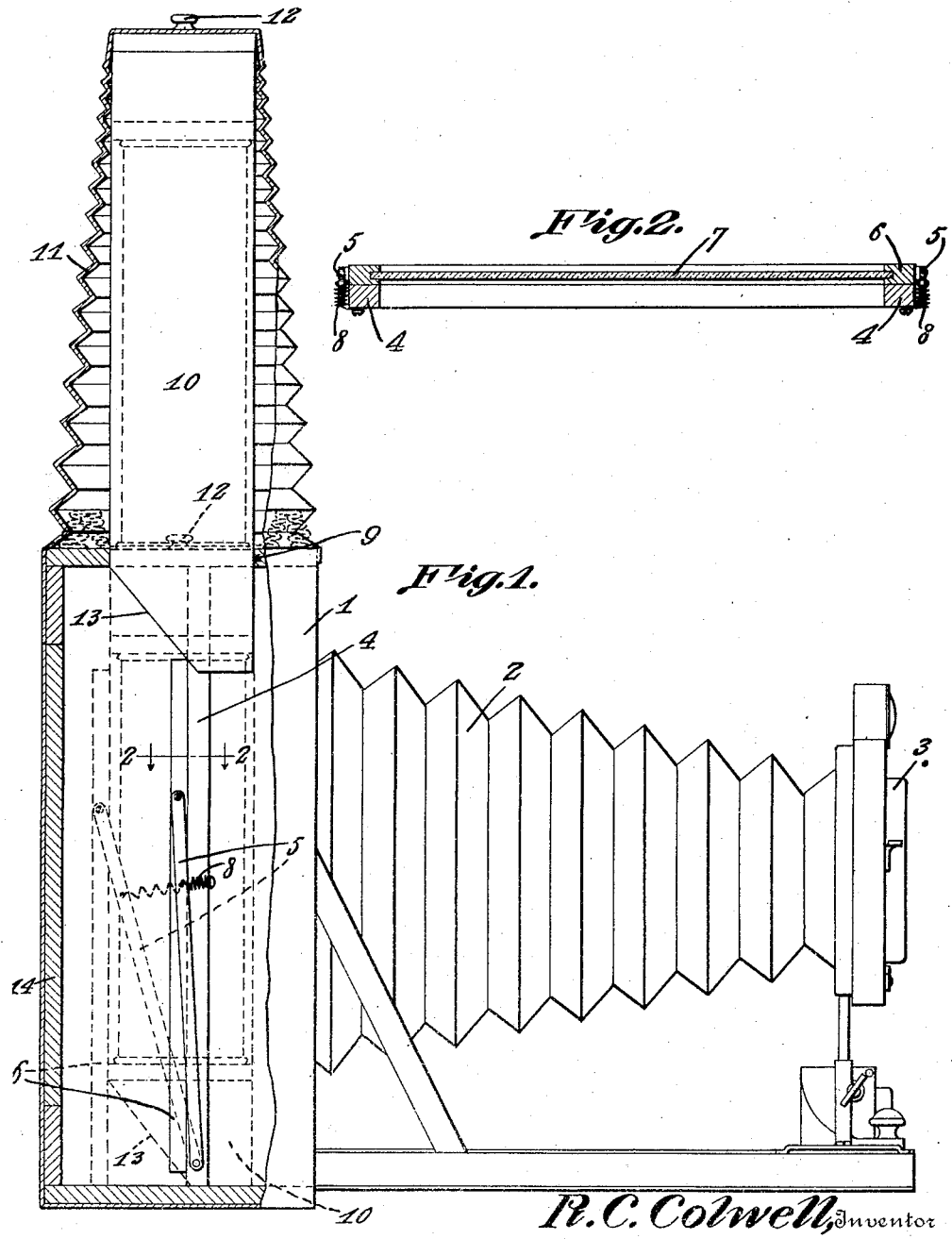
R. C. Colwell, Inventor

UNITED STATES PATENT OFFICE.

ROBERT CAMERON COLWELL, OF BEAVER FALLS, PENNSYLVANIA.

CAMERA.

1,298,296.  Specification of Letters Patent.  Patented Mar. 25, 1919.

Application filed December 12, 1917. Serial No. 206,807.

*To all whom it may concern:*

Be it known that I, ROBERT C. COLWELL, a subject of George V, King of England, residing at Beaver Falls, in the county of Beaver and State of Pennsylvania, have invented a new and useful Camera, of which the following is a specification.

This invention relates to cameras, one of its objects being to provide means whereby the camera can be accurately focused, it being possible to shift the film holder out of its normal position, thereby to allow a ground glass to move into place so that, by opening the back of the camera, the image can be seen on this glass or screen.

A still further object is to provide a film holder which can be easily raised and lowered from and into position within the camera case, the movement of said holder into the case serving to shift the ground glass back to its initial position in the rear of the film holder.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a view partly in side elevation and partly in section of a camera having the present improvements combined therewith, the film holder being shown by full lines, in raised position and, by dotted lines, in lowered or normal position.

Fig. 2 is a section on line 2—2 of Fig. 1.

Referring to the figures by characters of reference 1 designates the case of the camera, the same being provided with the usual bellows 2 extending to the lens tube 3. Arranged within the case 1 at the sides thereof are stop cleats 4 and pivotally connected to the lower portions of these cleats are links 5 which are connected to the sides of a frame 6 carrying a ground glass 7. Springs 8 connect the links 5 to the cleats 4 thus to hold the frame 6 normally drawn toward the cleats 4.

Slidably mounted within an opening 9 at the top of the case 1 is a film holder 10 the upper end of which is closed and connected, by a bellows 11, to the top of the case. A handle 12 or the like may be provided whereby the holder can be readily raised and lowered relative to case 1. The lower end of the film holder 10 is beveled as indicated at 13 and when the frame 6 is drawn forward against the cleats 4 while the holder 10 is elevated, this beveled portion will rest upon the upper end of the frame 6 as shown in Fig. 1. With the parts thus located it will be apparent that the image can be seen readily on the ground glass 7 by opening the door 14 in the back of the case 1. After the proper focus has been obtained, the door 14 is closed and the holder 10 is pushed downwardly. This will cause the beveled portion 13 to deflect the frame 6 rearwardly so as to bring the holder 10 into position in front of the frame 6 as shown by dotted lines in Fig. 1, said frame 6 being held pressed against the back face of the holder 10. By then operating the camera as ordinarily, the film can be exposed. By then pulling upwardly on the holder 10 the frame 6 will be drawn automatically forwardly against the cleats 4, the door 14 can be opened, and the desired focus can again be obtained.

It will be seen that this structure is very simple, durable and efficient, and advantageous because no guess work is needed in order to properly focus the camera.

What is claimed is:—

In a camera the combination with a case, of links within the case and pivotally connected to the lower portions of the sides thereof, a frame pivotally connected at its sides to the upper ends of the links, stop cleats within the case and upon the sides thereof, springs connecting the links with the sides of the case for holding the frame normally pressed against the cleats, a ground glass screen secured in the frame, a film holder slidably mounted in the top of the case and having a beveled lower end adapted, when the holder is moved into the case, to engage the upper end of the frame and shift said frame rearwardly out of the path of the holder, and a bellows connecting the case with the outer ends of the holder and constituting a housing for the holder.

In testimony that I claim the foregoing as my own, I have hereto affixed my signature in the presence of two witnesses.

ROBERT CAMERON COLWELL.

Witnesses:
 WILLARD FINLEY,
 WM. SCHUTTE.

Copies of this patent may be obtained for five cents each, by addressing the "Commissioner of Patents, Washington, D. C."